United States Patent [19]
Yamasaki et al.

[11] Patent Number: 5,519,547
[45] Date of Patent: May 21, 1996

[54] MAGNETIC RECORDING AND REPRODUCING APPARATUS RECORDING AND REPRODUCING PLURAL TYPES OF DATA SIGNALS AT DIFFERENT DATA RATES

[75] Inventors: Tatsuo Yamasaki; Junichi Nose; Hideki Kaneko; Tohru Inoue, all of Nagaokakyo, Japan

[73] Assignee: Mitsubishi Denki Kabushiki Kaisha, Japan

[21] Appl. No.: 92,683

[22] Filed: Jul. 16, 1993

[30]     Foreign Application Priority Data

| Jul. 17, 1992 | [JP] | Japan | 4-190880 |
| Jul. 24, 1992 | [JP] | Japan | 4-198467 |

[51] Int. Cl.⁶ ............ G11B 15/14; H04N 5/78; H04N 5/76
[52] U.S. Cl. .......... 360/64; 360/10.1; 360/11.1; 358/335
[58] Field of Search ............... 360/8, 9.1, 10.1, 360/10.2, 10.3, 32, 64, 70, 11.1, 35.1; 358/312, 321, 338, 313, 335

[56]         References Cited

U.S. PATENT DOCUMENTS

| 4,342,053 | 7/1982 | Hirota | 360/64 |
| 5,063,453 | 11/1991 | Yoshimura et al. | 360/32 |
| 5,235,471 | 8/1993 | Fell et al. | 360/64 |

FOREIGN PATENT DOCUMENTS

| 3-113804 | 5/1991 | Japan . |
| 4-98981 | 3/1992 | Japan . |

*Primary Examiner*—W. Chris Kim

[57]         ABSTRACT

A magnetic recording and reproducing apparatus for recording and reproducing plural types of data signals respectively different in data rate, and capable of completely eliminating noise when reproducing data signals of high data rate or low data rate at slower or faster speed than normal speed.

4 Claims, 12 Drawing Sheets

Fig. 4(a) TIME

Fig. 4(b) RECORD SIGNAL OF 1st INFORMATION

Fig. 4(c) RECORD SIGNAL OF 2nd INFORMATION

Fig. 5

Fig. 6(a) TIME

Fig. 6(b) REPRODUCTION SIGNAL OF 2nd INFORMATION AT DOUBLE SPEED

Fig.7(a)
DECODER OUTPUT

| F1 | F2 | F3 | F4 | F5 | F6 | F7 | F8 | F9 | F10 |

0, T, 2T, 3T, 4T, 5T

Fig.7(b)
SELECTOR OUTPUT

F1　　F3　　F5　　F7　　F9

Fig.7(c)
EXPANSION CIRCUIT OUTPUT

| F1 | F3 | F5 | F7 | F9 |

Fig.9(a) DECODER OUTPUT

| 0 | | T | | 2T | | 3T | | 4T | | 5T |
|---|---|---|---|---|---|---|---|---|---|---|
| F1 | F2 | F3 | F4 | F5 | F6 | F7 | F8 | F9 | F10 | |

Fig.9(b) SELECTOR OUTPUT

| F1+F2 | F3+F4 | F5+F6 | F7+F8 | F9+F10 |
|---|---|---|---|---|

Fig.9(c) EXPANSION CIRCUIT OUTPUT

| F1+F2 | F3+F4 | F5+F6 | F7+F8 | F9+F10 |
|---|---|---|---|---|

Fig.10(a)
TIME

Fig.10(b)
DEMODULATOR OUTPUT OF
1st INFORMATION AT 1/2 OR 1/4 SPEED

Fig. 11(a) TIME
Fig. 11(b) DECODER OUTPUT
Fig. 11(c) SELECTOR OUTPUT
Fig. 11(d) COMPRESSION CIRCUIT OUTPUT

Fig. 12(a) TIME
Fig. 12(b) DECODER OUTPUT
Fig. 12(c) SELECTOR OUTPUT
Fig. 12(d) COMPRESSION CIRCUIT OUTPUT

MAGNETIC RECORDING AND REPRODUCING APPARATUS RECORDING AND REPRODUCING PLURAL TYPES OF DATA SIGNALS AT DIFFERENT DATA RATES

BACKGROUND OF THE INVENTION

1. Field of the Invention

The present invention relates to a magnetic recording and reproducing apparatus for recording and reproducing plural types of data signals of different data rate.

2. Description of the Related Art

Figure 1:
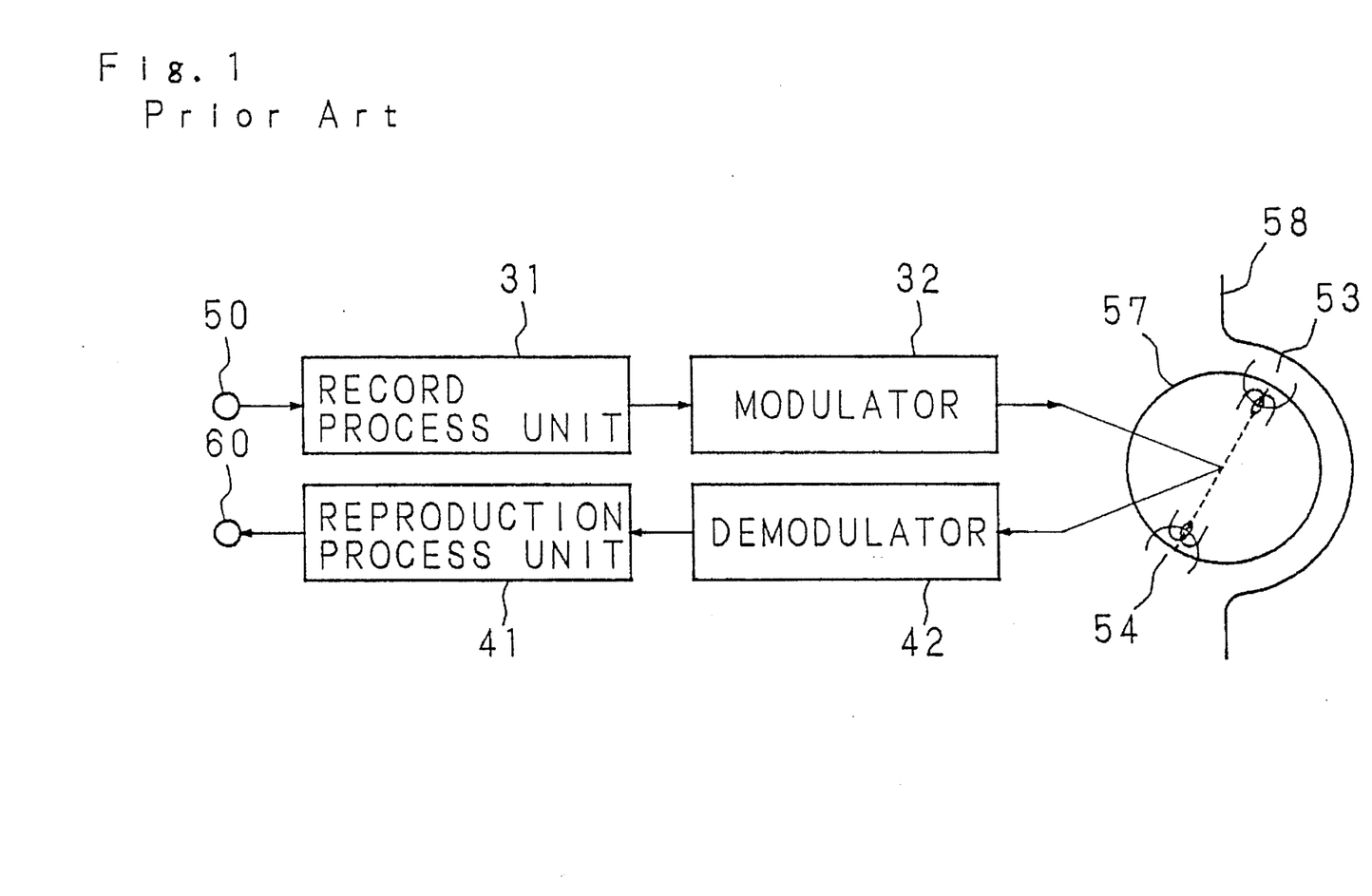
FIG. 1 is a block diagram of a conventional digital VTR.

As a magnetic recording and reproducing apparatus for recording and reproducing, for example, video signals as data signals on a magnetic tape (VTR), a digital VTR for recording and reproducing digitized data of video signals is known. FIG. 1 shows a conventional block diagram of such digital VTR, in which numeral 50 denotes an input terminal for digital data relating to, video signals, for example, numeral 31 denotes a record process unit, 32 denotes a digital modulator, 53, 54 denote heads mutually different in the azimuth, disposed to confront each other at 180 degrees on a rotary drum 57, 58 denotes a magnetic tape, 60 denotes a digital data output terminal, 41 denotes a reproduction process unit, and 42 denotes a digital demodulator.

Digital data such as video signals inputted to the digital data input, terminal 50 at the time of recording are fed in the record process unit, 31. The record process unit 31 codes the digital data for error correction to detect and correct an error, and outputs the coded digital data to the modulator 32. In the modulator 32, the inputted digital codes are transformed into signals in a form suited to recording, and are output to be recorded on the magnetic tape 58 by the magnetic heads 53, 54 on the rotary drum 57.

The signal reproduced by the magnetic heads 53, 54 at the time of reproduction is transformed into the original digital code in the demodulator 42. The reproduction process unit 41 decodes for error correction, detecting and correcting the error caused in the process of recording and reproduction. reproduction process unit 41, The digital data in the same signal form as in recording is outputted from the digital data output terminal 60.

Incidentally, when recording video signals, such a digital VTR, it is desired as to record different signal forms, that is, different in data quantity, of the HDTV being put in practical use and the existing television signals by NTSC system in the same apparatus. Moreover, in such a digital VTR, it is also desired to record digital codes of the same signal form but different in data quantities corresponding to the length of recording time by the same apparatus. In other words, the VTR must record and reproduce data of different data rates in the same apparatus.

However, in the composition of the conventional digital VTR shown in FIG. 1, recording and reproducing data can only be performed at the same data rate.

SUMMARY OF THE INVENTION

The invention is intended to solve the above problems, and it is hence a primary object thereof to present a magnetic recording and reproducing apparatus capable of recording and reproducing data of plural types different in data rate, and completely eliminating the noise in reproducing data of high data rate and low data rate at faster or lower speed than normal speed.

The above and further objects and features of the invention will more fully be apparent from the following detailed description with accompanying drawings.

BRIEF DESCRIPTION OF THE DRAWINGS

FIG. 12(c) is a timing chart of selector outputs in ¼ speed reproduction of the first information in Embodiment 5.

DESCRIPTION OF THE PREFERRED EMBODIMENTS

[Embodiment 1]

Figure 2:
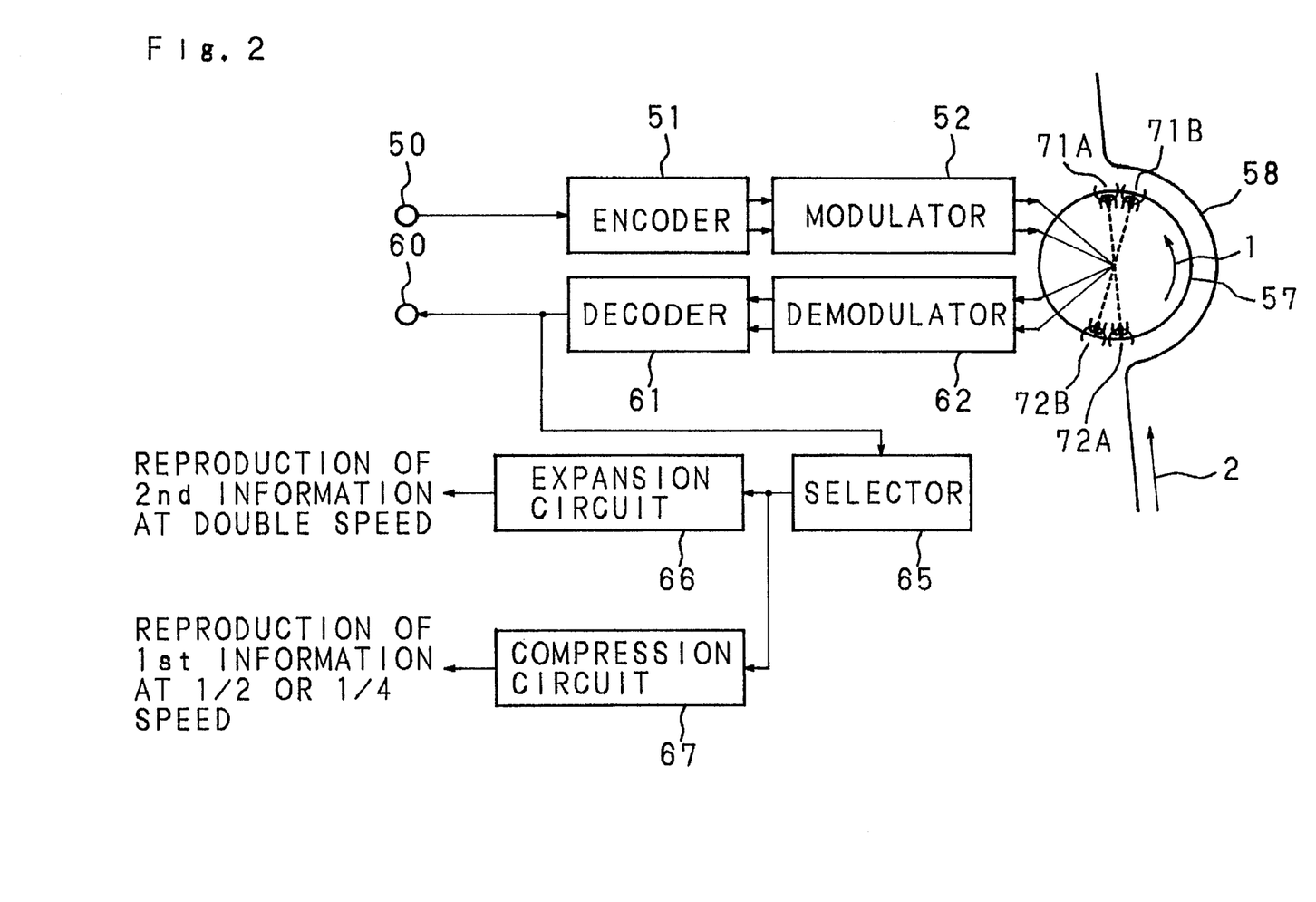
FIG. 2 is a block diagram of a digital VTR of the invention.

An embodiment of the invention will be described below while referring to the accompanying drawings. FIG. 2 is a block diagram of recording and reproducing systems of a digital VTR apparatus for recording and reproducing information of high data rate (first information) and information of low data rate (second information). In the diagram, numeral 50 denotes an input terminal of digital data related to video signal, for example, 51 denotes an encoder, 52 denotes a digital modulator consisting of, two channels, for example 71A, 71B and 72A, 72B denote two sets of heads different in the azimuth in each set of two, and the two sets of heads are disposed to confront each other nearly at 180 degrees on a rotary drum 57. Numeral 58 denotes a magnetic tape, 60 denotes a digital output terminal, 61 denotes a decoder, 62 denotes a digital demodulator of two channels, for example, 65 denotes a selector, 66 denotes all expansion circuit, and 67 denotes a compression circuit.

Recording of the first information will be described. The digital data such as video signals related to the first information, are inputted to the digital input terminal 50 at the time of recording and are fed into the encoder 51. The encoder undergoes error correction coding for detecting and correcting an error, and channel division corresponding to the number of recording channels, and digital codes of two channels, for example, are outputted to the digital modulator 52. The modulator 52 transforms the inputted digital codes of the respective two channels into signals in a form suited to recording. The transformed data is recorded on the magnetic tape 58 by two sets of the magnetic heads 71A, 71B and 72A, 72B on the rotary drum 5. In this case, by one set of the magnetic heads 71A, 71B and the other set of the magnetic heads 72A, 72B where each set of the heads have different azimuths θ 1, θ 2, and are disposed nearly at the same position, a pair of (two) tracks different in the azimuth are recorded and reproduced substantially at the same time, and as a result four tracks are scanned per one revolution of the rotary drum. Herein, the head rotating speed in recording of the first information will be denoted to be R, and the tape running speed to be V.

Figure 3:
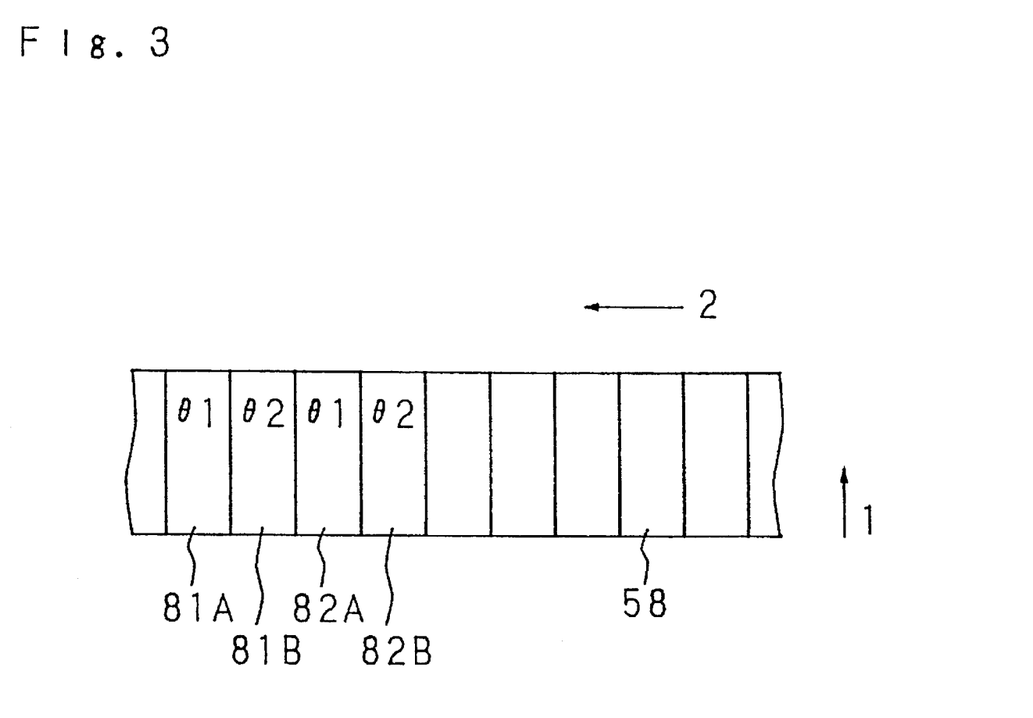
FIG. 3 is a diagram showing the state of track tracing in recording and normal speed reproduction of a first information.

FIG. 3 shows the track tracing state when recording the first information mentioned above. In the diagram, numeral 1 denotes a head scanning direction, and 2 denotes a tape running direction. Of the tracks 81A, 81B, 82A, 82B on the magnetic tape 58, one pair of (two) tracks 81A, 81B are recorded almost simultaneously by a set of the magnetic heads 71A, 71B with different azimuths θ 1, θ 2 disposed nearly at the same position, while the tracks 82A, 82B are recorded almost simultaneously by the other magnetic heads 72A, 72B with different azimuths θ 1, θ 2. It is supposed herein, that the data in one field period T in the first information inputted to the input terminal 50 is composed of four tracks of 81A, 81B, 82A, 82B, for example, recorded during time T required for one revolution of the drum.

Figure 4A:
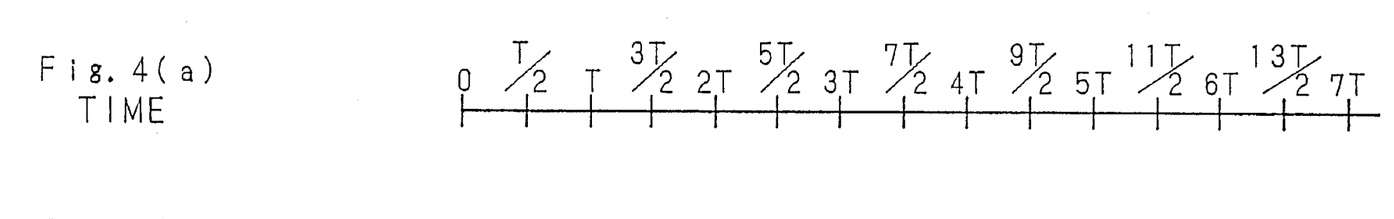
FIG. 4(a) is time of recording the first and second informations.
Figure 4B:
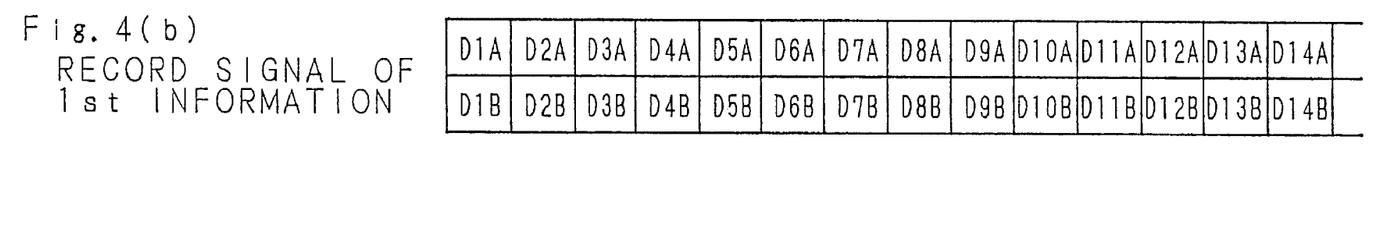
FIG. 4(b) is a timing chart of recording the first information.

FIG. 4 is a timing chart in recording the first information mentioned above, in which FIG. 4(a) shows the time and FIG. 4(b) shows the recording signals of two channels concerning the first information outputted from the encoder 51 or modulator 52, and the recording signals of one field of the first information is composed of D1A, D1B, D2A, D2B, for example. In the period of T/2 for half revolution of the drum, the recording signals of two channels D1A and D1B are simultaneously recorded by the heads 71A and 71B, and the recording tracks 81A and 81B in FIG. 3 are formed. In the period of T/2 from time T/2 till time T for the next half revolution of the drum, the recording signals of two channels D2A and D2B are simultaneously recorded by the heads 72A and 72B, thereby forming the recording tracks 82A and 82B in FIG. 3. Hence, four tracks 81A, 81B, 82A, 82B are formed within time T corresponding to one revolution, in other words, within one field period.

In normal speed reproduction, same as recording the first information, the head rotating speed is set to be R and the tape running speed is set to be V, and reproduction is performed exactly in the same track tracing state as in recording. Reproduced signals of two channels shown in FIG. 4(b) reproduced at the time-shown in FIG. 4(a) from the recording tracks in FIG. 3 by the magnetic heads 71A, 71B, 72A, 72B are transformed into the original digital codes of two channels by the demodulator 62 composed of at least two channels. The transformed data is formed into one channel by channel synthesizing in the decoder 61 after error correction decoding for detecting and correcting code errors occurring in the process of recording and reproducing. The digital data related to the first information in the same signal form as in recording is outputted to the digital data output terminal 60.

Recording data of a low data rate, that is, second information will be explained hereinafter. For simplicity of explanation, the quantity of the second information is supposed to be (1/r or nearly 1/r), of the first information. Accordingly, the head rotating speed is supposed to be R/2 and tape running speed is to be V/2. The digital data related to the second information such as video signals inputted to the digital input terminal 50 at the time of recording, is fed in the encoder 51 to undergo error correction coding for detecting and correcting an error, and channel division corresponding to the number of recording channels, thereby to output digital codes of two channels, for example, to the modulator 52. The modulator 52 transforms the inputted digital codes of two channels into signals in a form suited to recording, and records the transformed data on the magnetic tape 58 by two sets of the magnetic heads 71A, 71B, 72A, 72B disposed on the rotary drum 57. In this case, by the one set of the magnetic heads 71A, 71B and the other set of the magnetic heads 72A, 72B where each set of the heads have different azimuths θ 1, θ 2 and are disposed nearly at the same position, a pair of (two) tracks different in the azimuth are recorded and reproduced almost simultaneously, and two pairs of tracks alternately. Consequently, four tracks are scanned per one revolution of the rotary drum.

Figure 5:
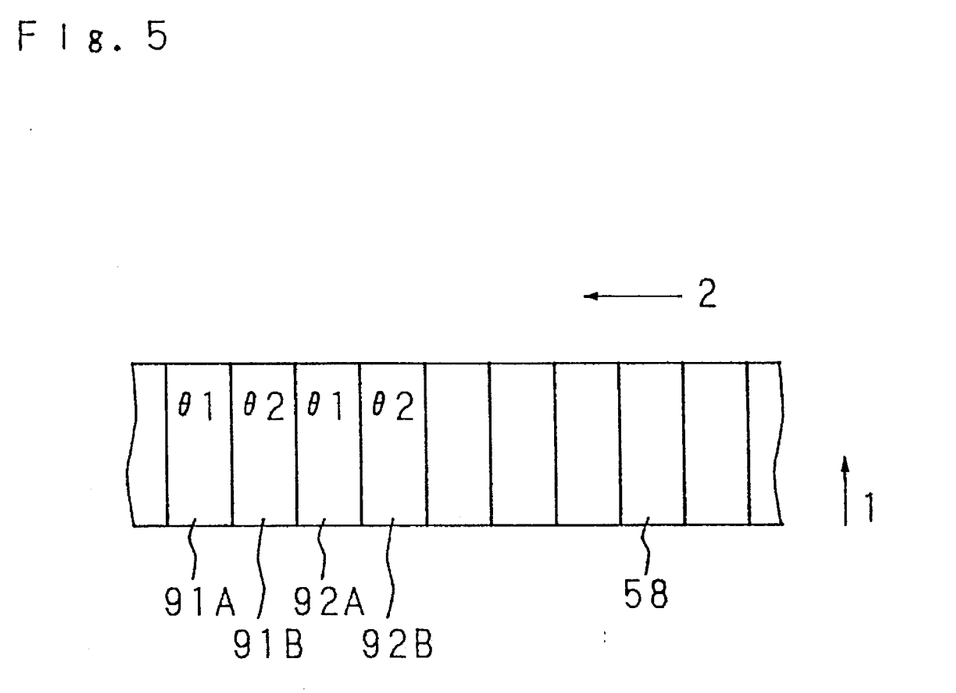
FIG. 5 is a diagram showing the state of track tracing in recording and normal speed reproduction of the second information.

The track tracing state in the case of recording the second information is shown in FIG. 5. In the diagram, numeral 1 denotes the head scanning direction, 2 denotes the tape running direction, and a pair of (two) tracks 91A, 91B among tracks 91A, 91B, 92A, 92B on the magnetic tape 58 are recorded almost simultaneously, by a set of magnetic heads 71A, 71B, for example, with different azimuths θ 1, θ 2 disposed nearly at the same position. The tracks 92A, 92B are recorded almost simultaneously by another set of magnetic heads 72A, 72B witch different azimuths θ 1, θ 2. Since the head rotating speed is R/2, and the tape running speed is V/2, the data of one field period T in the second information inputted from the input terminal 50 is composed of two tracks 91A, 91B recorded in the time T required for ½ revolution of the drum.

Figure 4C:
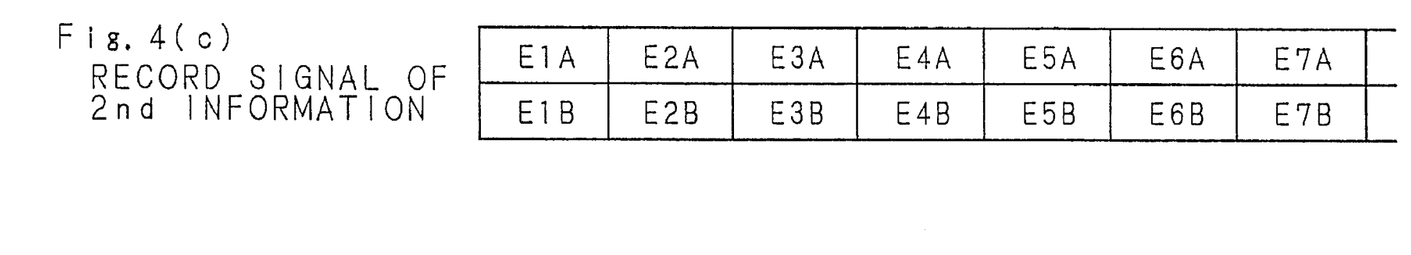
FIG. 4(c) is a timing chart of recording the second information.

FIG. 4(c) is a timing chart of recording signals of two channels relating to the second information outputted from the encoder 51 or modulator 52 at the time in recording the second information, and the recording signals of one field of the second information is composed of E1A, E1B, for example. During the period of T of half revolution of the drum, the recording signal of two channels E1A, E1B are simultaneously recorded by the heads 71A, 71B, and are formed as recording tracks 91A and 91B in FIG. 5. In the period of the next, half revolution of the drum, from time T to time 2T, the recording signals of two channels E2A, E2B are simultaneously recorded by the heads 72A, 72B, and recording tracks 92A, 92B in FIG. 5 are formed.

That is, since both the head rotating speed and tape running speed in the second information recording are half of those in recording of the first information, the track inclination angles in recording are identical and formed track patterns are exactly the same.

In normal speed reproduction concerning the second information, same as in the second information recording, the head rotating speed is R/2 and tape running speed is V/2, and reproduction is performed in the same track tracing state as in recording. Reproduction signals of two channels in FIG. 4(c) reproduced from the recording tracks in FIG. 5 by the magnetic heads 71A, 71B, 72A, 72B are transformed into the original digital codes of two channels by the demodulator 62 composed of at least two channels, and are fed into the decoder 61 to undergo error correction decoding for detecting and correcting code error occurring in the process of recording and reproducing and forming into one channel by channel synthesizing. The digital data concerning the second information in the same signal form as in recording is outputted from the digital data output terminal 60.

The double speed (r times speed) reproduction of the second information will be explained. The head rotating speed and tape running speed in the double speed reproduction are R and V which are same as in the recording or normal speed reproduction of the first information, that is, twice as fast as in recording of the second information. Therefore, as mentioned above, the tracks shown in FIG. 5 can be traced same as in recording in every half revolution of the drum by one set of the heads 71A, 71B or by the other set of the heads 72A, 72B.

Figure 6A:
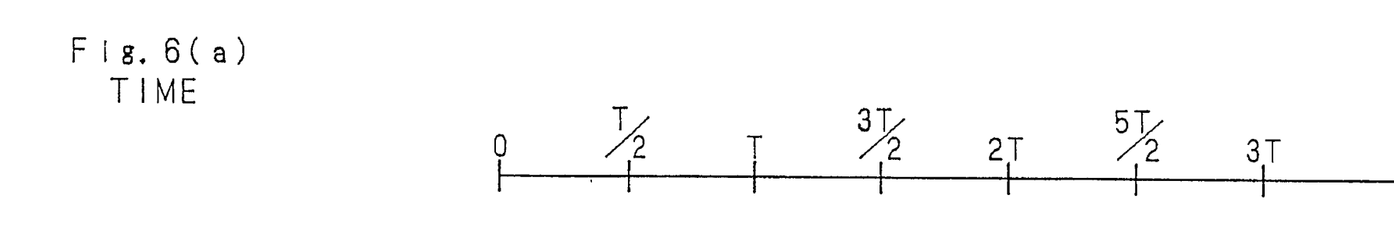
FIG. 6(a) is a reproduction time in Embodiment 1.
Figure 6B:
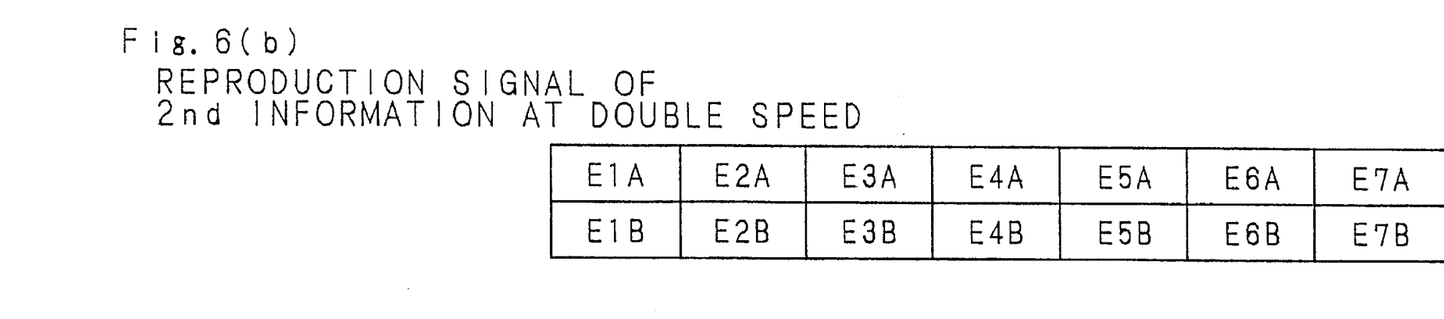
FIG. 6(b) is a timing chart of demodulator outputs in double speed reproduction of the second information in Embodiment 1.

FIG. 6(a) shows the time expressed by the same timing axis as in FIG. 4(a) and FIG. 6(b) shows the reproduction signals of two channels outputted from the demodulator 62 in double speed reproduction. As clear from the contrast with the timing chart in the second information recording shown in FIG. 4(c), digital codes E1A, E1B of two channels composing the second information in one field period T in recording, and being reproduced by the heads 71A, 71B of two channels, for example, are reproduced in time T/2 which is half of the time in recording. Similarly, digital codes E2A, E2B of two channels reproduced by the heads 72A, 72B of two channels are reproduced in time T/2 which is half of the time in recording. That is, the recording signals in specified period of the second information are completely reproduced in double speed reproduction within the period of ½ of the specified period which is equivalent to be time-compressed to ½.

Figure 7A:
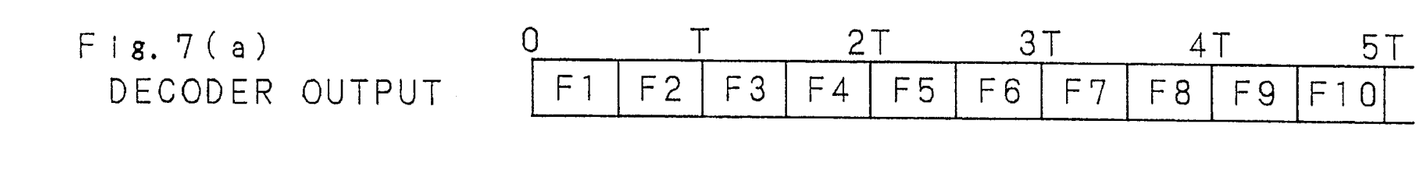
FIG. 7(a) is a reproduction time in Embodiment 1.

The reproduced signals of two channels outputted from the demodulator 62 in double speed reproduction shown in FIG. 6(b) are fed into the decoder 61 to undergo error correction decoding for detecting and correcting a code error occurring in the process of recording and reproducing and forming into one channel by channel synthesizing to obtain decoder outputs as shown in FIG. 7(a). In FIG. 7(a), the decoder outputs are expressed on the same timing axis as in FIG. 4(a). In FIG. 7(a), F1, F2, F3, F4, F5, F6, . . . denote data of one field time-compressed to ½ against recording time. F1 is a field of synthesizing two channel reproduced signals E1A and E1B in FIG. 6(b), F2 is field of E2A and E2B, F3 is a field of E3A and E3B, F4 is a field of E4A and E4B, and so forth. In the embodiment, F1, F3, F5, . . . are odd fields, and F2, F4, F6, . . . are even fields.

Figure 7B:
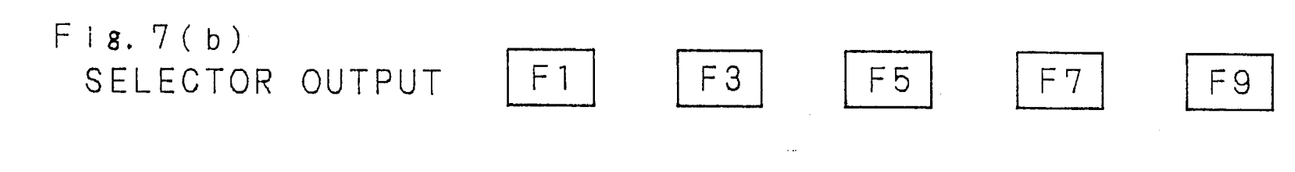
FIG. 7(b) is a timing chart of decoder outputs in double speed reproduction of the second information in Embodiment 1.
Figure 7C:
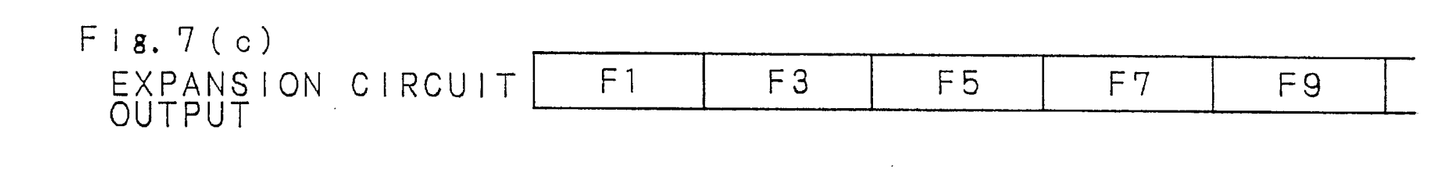
FIG. 7(c) is a timing chart, of selector outputs in double speed reproduction of the second information in Embodiment 1.

The decoder outputs in FIG. 7(a) are fed into the selector 65, and, after only odd fields such as F1, F3 and F5 are selected as shown in FIG. 7(b), for example, the odd fields are time-expanded double in the expansion circuit 66 containing a field memory. The double time expansion may be easily realized, for example, by reading out the data of the odd fields written in the field memory in the expansion circuit 66 at ½ speed of that in writing. FIG. 7(c) shows digital data in double speed reproduction outputted from the expansion circuit 66, and data in each field matching with the original one field period T in recording, such as F1, F3 and F5 are sequentially obtained. That is, double speed reproduction of one-field data without noise is obtained in every other field.

The fields used in double speed reproduction may be also composed of even fields such as F2, F4 and F6 selected by the selector 65.

[Embodiment 2]

Figure 8A:
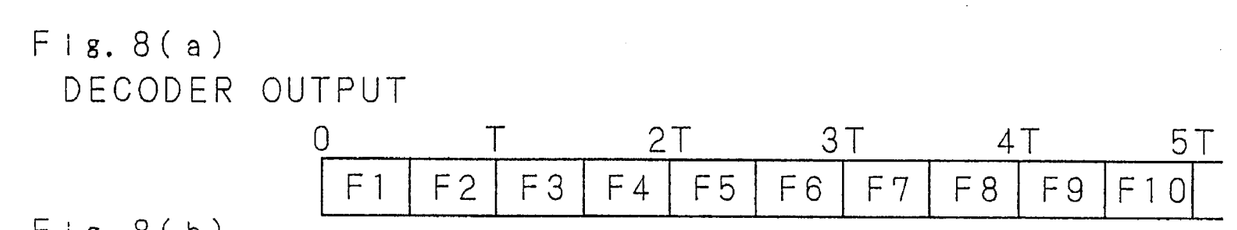
FIG. 8(a) is a reproduction time in Embodiment 2.

In Embodiment 1, each field in double speed reproduction is composed of either odd or even fields, but double speed reproduction data may be composed of completely noiseless one-frame data in every other frame. FIG. 8(a) shows the same outputs as shown in FIG. 7(a) of the decoder in FIG. 2. In FIG. 8(a), F1, F2, F3, F4, F5, F6, F7, F8, F9, F10, . . . are one field data time-compressed to ½ against each recording time, in which a frame FR1 is composed of adjacent odd field F1 and even field F2, a frame FR2 is composed of adjacent odd field F3 and even field F4, a frame FR3 is composed of adjacent odd field F5 and even field F6, and so forth sequentially.

Figure 8B:
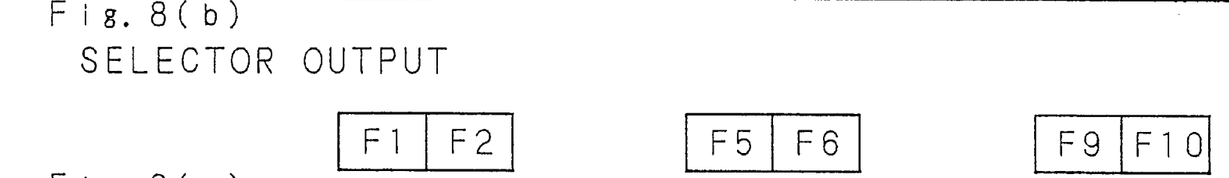
FIG. 8(b) is a timing chart, of selector outputs in double speed reproduction of the second information in Embodiment 2.
Figure 8C:
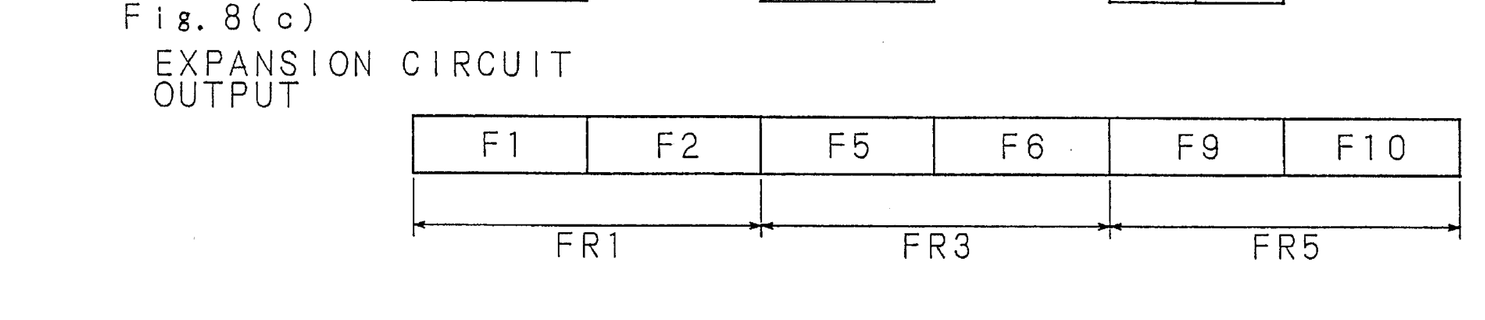
FIG. 8(c) is a timing chart of expansion circuit outputs in double speed reproduction of the second information in Embodiment 2.

The decoder outputs of FIG. 8(a) are fed into the selector 65, and are selected in every other frame as shown in FIG. 8(b), such as frame FR1 of F1 and F2, frame FR3 of F5 and F6, and frame FR5 of F9 and F10, and time-expanded double by the expansion circuit 66 containing a field memory and others. The double time expansion may be easily realized by, for example, reading out the selected data written in the field memory of the expansion circuit 66 at ½ speed of that in writing. FIG. 8(c) shows the digital data in double speed reproduction outputted from the expansion circuit 66, and the data F1 and F2, F5 and F6, F9 and F10 and so forth are sequentially obtained in every field, coinciding with the one-field period T in recording. That is, double speed reproduction data consisting of perfect one-frame data without any noise is obtained in every other frame, such as FR1, FR3 and FR5.

The frames used in double speed reproduction may be composed also of the frame FR2 of fields F3 and F4, and frame FR4 of fields F7 and F8 selected by the selector 65.

[Embodiment 3]

Figure 9A:
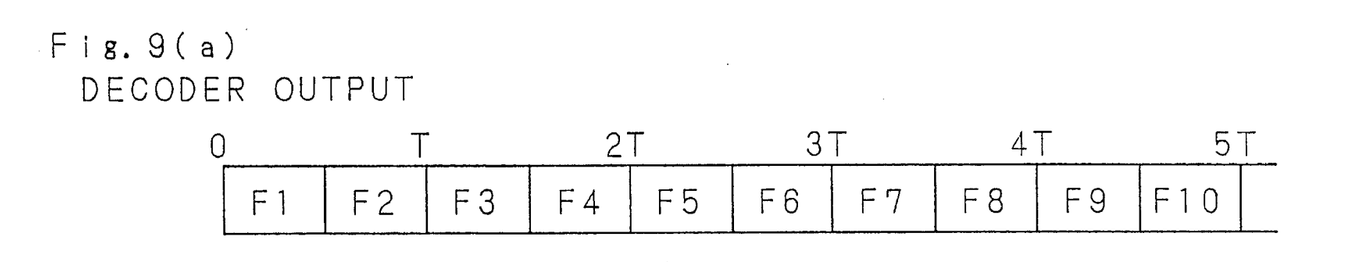
FIG. 9(a) is a timing chart of decoder outputs in double speed reproduction of the second information in Embodiment 3.

In Embodiments 1 and 2, each field picked up in double speed reproduction is composed of one field data. Instead, the data of each field in double speed reproduction may be also composed of synthesizing partial data in plural fields. Such example is shown in FIG. 9. The decoder outputs in FIG. 9(a) are same as those in FIG. 7(a) from the decoder in FIG. 2. In FIG. 9(a), F1, F2, F3, F4, F5, F6, F7, F8, F9, F10 . . . are one-field data time-compressed to ½ against each recording time.

Figure 9B:
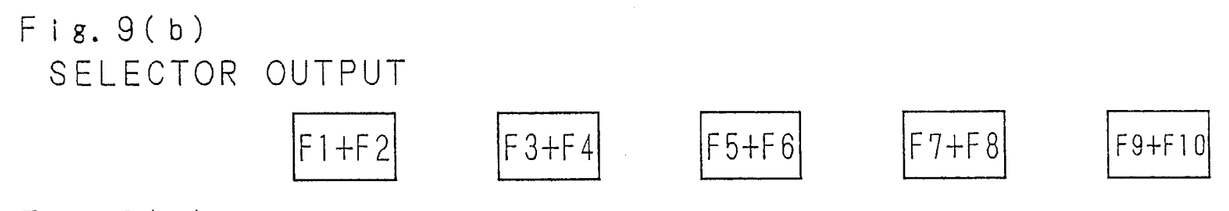
FIG. 9(b) is a timing chart of selector outputs in double speed reproduction of the second information in Embodiment 3.

The decoder outputs in FIG. 9(a) are fed into the selector 65, and the reproduction data of every other line from the upper end of the screen is selected in field F1, for example, and in the other field F2 for composing the frame FR1, the reproduction data of every other line from the upper end of the screen is selected, and both are alternately disposed from the upper end of the screen by matching the position on the screen of one field. FIG. 9(b) shows the output of the selector 65 mentioned above, and the period indicated by (F1+F2) is the result of alternately disposing selected lines from both fields from the upper end of the screen of one field.

Figure 9C:
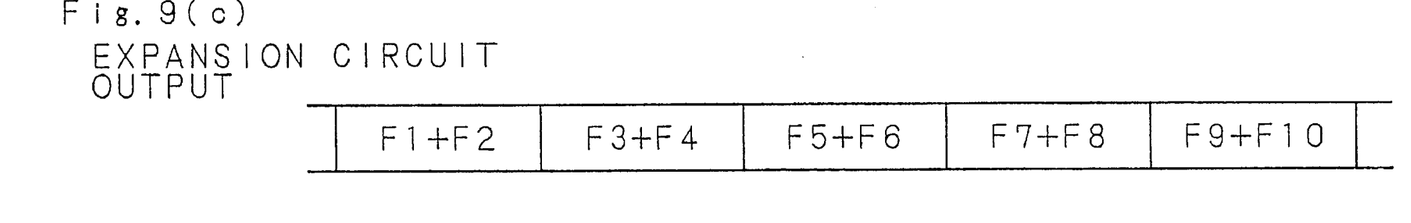
FIG. 9(c) is a timing chart of expansion circuit outputs in double speed reproduction of the second information in Embodiment 3.

Thereafter, (F3+F4) and (F5+F6) are similarly processed. The data after selection is time-expanded double by the expansion circuit 66 containing a field memory and others. The double time expansion is easily realized by reading out the selected data written in the field memory in the expansion circuit 66 at ½ speed of that in writing. FIG. 9(c) shows the digital data in double speed reproduction outputted from the expansion circuit 66, and data (F1+F2), (F3+F4), (F5+F6), and others in every field coinciding with the one-field period T in recording are sequentially obtained.

Generally, since the data between adjacent odd field and even field has high correlation, a picture without any strange feeling and a nearly perfect double speed reproduction data without noise can be obtained from the reproduced data in every field such as (F1+F2) in the output of the expansion circuit 66 in FIG. 9(c).

In Embodiment 3, the one-field data is obtained by selecting the data in every other line from the odd field and even field composing a frame, and matching both in position on the screen of one field and alternately disposing the selected lines from both the upper end of the screen, but the operation of the selector 66 is not limited to such operation alone. For example, the reproduction data of selected one field may be obtained by selecting the data in every two lines adjacent from the upper end in the odd and even fields, and alternately disposing the data in both fields. Moreover, the one-field data in double speed reproduction may be obtained by selecting the former half data in the odd field and the latter half data in the adjacent even field, then synthesizing the both halves into one field.

[Embodiment 4]

Figure 10A:
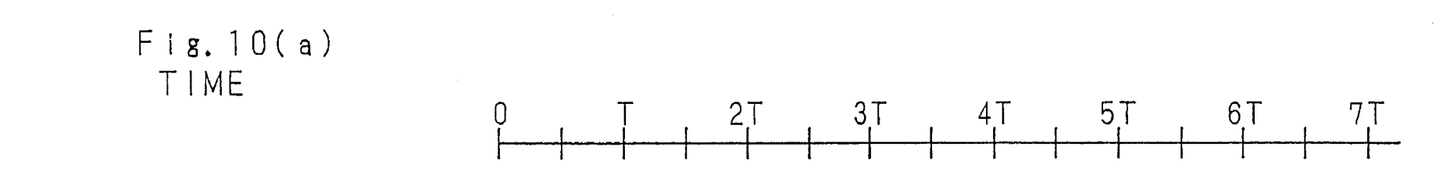
FIG. 10(a) is a reproduction time in Embodiment 4.

In this embodiment, ½ speed reproduction (1/r speed reproduction) of the first information in the digital VTR apparatus with the same constitution in Embodiment 1 will be explained. The drum rotating speed and tape running speed in ½ speed reproduction are R/2 and V/2, same as in recording or normal speed reproduction of the second information, that is, ½ of those in the first information recording. Therefore, the tracks concerning the first information shown in FIG. 3 can be traced same as in recording, as mentioned above, in every ½ revolution of the drum by the one set of the heads 71A, 71B or the other set of the heads 72A, 72B. FIG. 10(a) shows the time expressed on the same timing axis as in FIG. 4(a), and FIG. 10(b) represents the reproduced signals of two channels outputted from the decoder 62 at the time of ½ speed reproduction.

As clear from the contrast with the timing chart in the first information recording as shown in FIG. 4(b), digital codes D1A, D1B of two channels composing the first information in ½ field period T/2 in the recording are reproduced, for example, by the heads 71A, 71B of two channels in time T, twice the recording time. Similarly, digital codes D2A, D2B of two channels are reproduced by the heads 72A, 72B of two channels also in time T twice the recording time. That is, in ½ speed reproduction, the signals of the first information recorded in specified period are completely reproduced within the double period of the specified period, which is equivalent to be time compressed twice against the recording time.

Figure 10B:
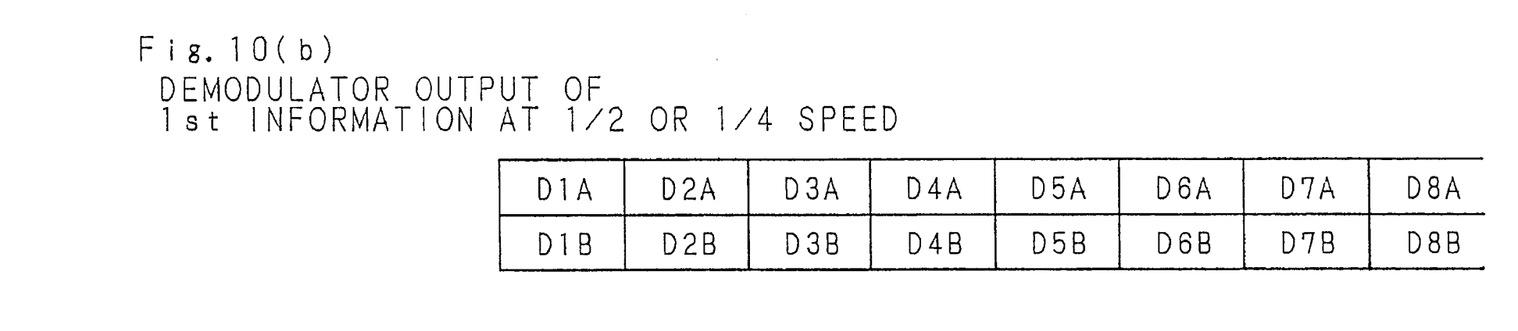
FIG. 10(b) is a timing chart of demodulator outputs in ½ speed reproduction and ¼ speed reproduction of the first information in Embodiment 4.
Figures 11A, 11B, 11C:
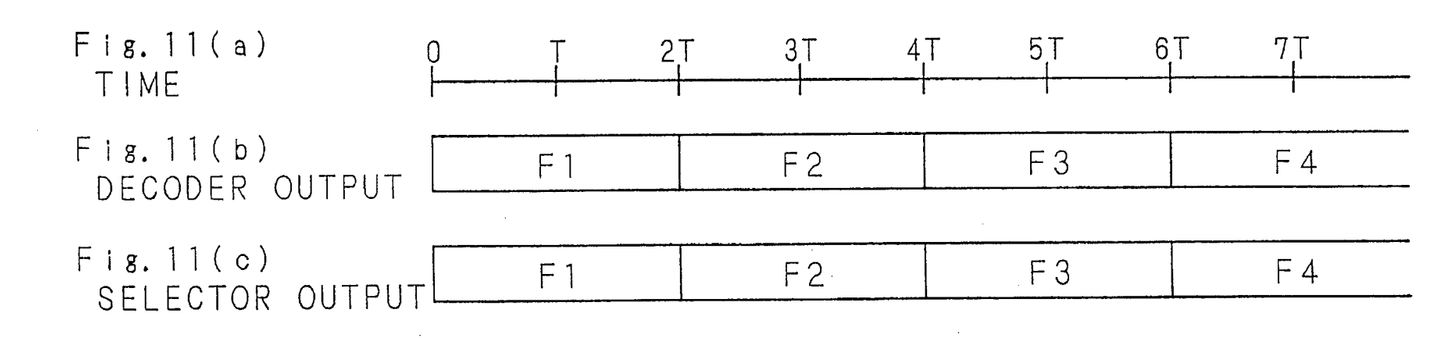
FIG. 11(a) is a reproduction time in Embodiment 4.
FIG. 11(b) is a timing chart of decoder outputs in ½ speed reproduction of the first information in Embodiment 4.

The reproduced signals of two channels outputted from the demodulator 62, shown in FIG. 10(b) at the time of ½ speed reproduction are inputted to the decoder 61 which undergoes error correction decoding for detecting and correcting a code error occurring in the process of recording and reproducing and forms the two channel data into one channel by channel synthesizing, thereby to obtain decoder outputs shown in FIG. 11(b). The time in FIG. 11(a) for the decoder outputs in FIG. 11(b) are expressed on the same timing axis as in FIG. 4(a). In FIG. 11(b), F1, F2, F3, F4, F5, F6, . . . are data of one field in every two-field period 2T time-expanded double against each recording time. F1 is a field synthesized from the channels of reproduced signals D1A, D1B, D2A, D2B of two channels in FIG. 10(b), F2 is from D3A, D3B, D4A, D4B, F3 is from D5A, D5B, D6A, D6B, F4 is from D7A, D7B, D8A, D8B, and so forth. F1, F3, F5, . . . are odd fields and F2, F4, F6, . . . are even fields. A frame FR1 is composed of adjacent odd field F1 and even field F2, and similarly a frame FR2 is composed of adjacent odd field F3 and even field F4, and a frame FR3 is composed of adjacent odd field F5 and even field F6.

Figure 11D:
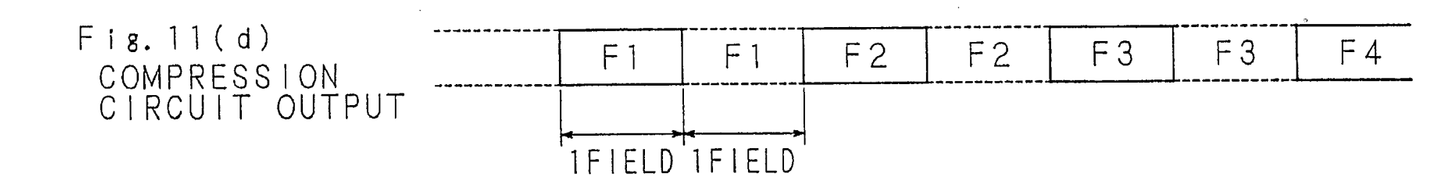
FIG. 11(d) is a timing chart of compression circuit outputs in ½ speed reproduction of the first information in Embodiment 4.

The decoder outputs in FIG. 11(b) are fed to the selector 65 which sequentially selects fields F1, F2, F3, F4 and F5 as shown in FIG. 11(c). Then, the compression circuit 67 composed of a field memory, etc., time-compresses each of the selected fields to ½. The time compression of ½ may be easily realized, for example, by reading out the data of the sequential fields from the field memory in the compression circuit 67 at double speed of writing. FIG. 11 (d) shows the data of one field in every one field period T in ½ speed reproduction, which is read out from the compression circuit 67 at timing delayed about T period from data writing timing of each of the sequential fields and time-compressed to ½. At this time, the compression circuit 67 continuously reads out and outputs the data of one field in every one field period T, which is time-compressed to ½ for two-field period. As a result, as shown by alternate solid line and broken line in FIG. 11 (d), data F1, F2, F3, F4 and others in every field are sequentially and continuously outputted in every two-field period.

Since the one-field data F1, F2, F3, F4 and others corresponding to one-field period in recording are sequentially outputted with composing the data of two fields (one frame), the reproduced data without any noise is obtained and recorded fields are completely reproduced in ½ speed reproduction.

If the memory in the compression circuit 67 has capacity at least twice as much as for the data obtained in the two-field period 2T (for example, data for F1) in the outputs from the selector 65 in FIG. 11(c), the compression circuit 67 normally compresses the data without overlap of writing and reading of the data for compression in the same memory area.

[Embodiment 5]

Figures 12A, 12B:
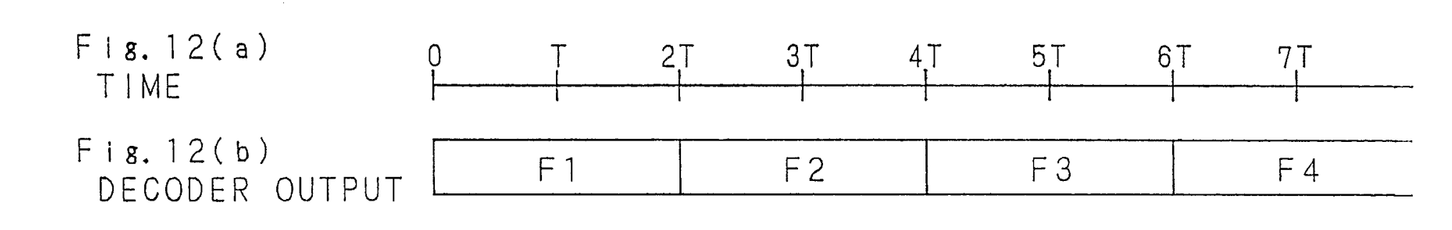
FIG. 12(a) is a reproduction time in Embodiment 5.
FIG. 12(b) is a timing chart of decoder outputs in ¼ speed reproduction of the first information in Embodiment 5.

In the ½ speed reproduction of the first information in Embodiment 4, all recorded frames are reproduced, but the reproduction data in ¼ [1/(2·r)] speed reproduction of the first information may be composed of either odd or even fields in one frame. In ¼ speed reproduction of this embodiment, the head rotating speed and tape running speed are R/2 and V/2 same as in recording and normal speed reproduction of the second information, or half of those in the first information recording. FIG. 12(b) shows decoder outputs same as those in FIG. 11(b) from the decoder in FIG. 2. In FIG. 12(b), F1, F2, F3, F4, F5, F6, F7, F8, F9, F10, . . . are data of one field in every two-field period 2T time-expanded double against each recording time. F1 is a field synthesized from the channels of reproduced signals D1A, D1B, D2A, D2B of two channels in FIG. 10(b), F2 is from D3A, D3B, D4A, D4B, F3 is from D5A, D5B, D6A, D6B, F4 is from D7A, D7B, D8A, D8B, and so forth. F1, F3, F5, . . . are odd fields and F2, F4, F6, . . . are even fields.

Figures 12C, 12D:
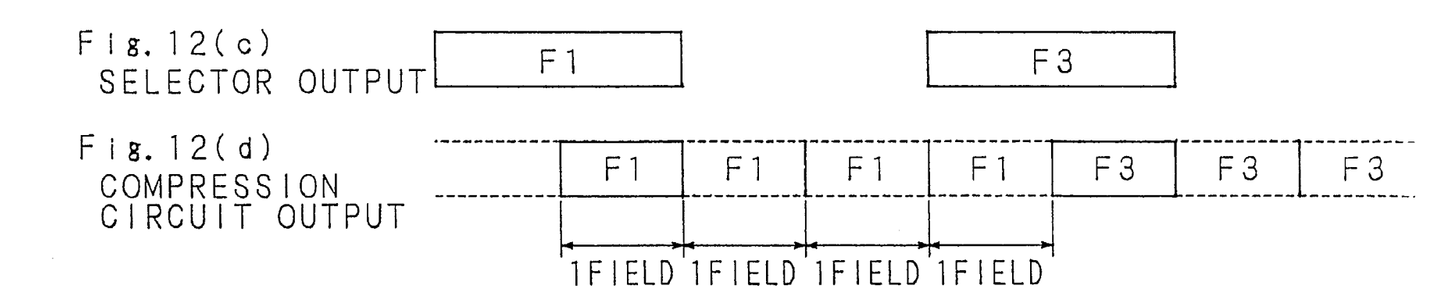
FIG. 12(c) is a timing chart of selector outputs in ½ speed reproduction of the first information in Embodiment 4.
FIG. 12(d) is a timing chart of compression circuit outputs in ¼ speed reproduction of the first information in Embodiment 5.

The decoder outputs of FIG. 12(b) are fed into the selector 65 which only selects odd fields F1, F3, F5, and so forth, for example, as shown in FIG. 12(c). Then the compression circuit 67 containing a field memory, etc., time-compresses each of the selected fields to ½. This time compression of ½ may be, easily realized by reading out the field of the sequential fields in the field memory at a double speed of writing. FIG. 12(d) shows the data of one field in every one field period T in ¼ speed reproduction, which is read out from the compression circuit 67. At this time, the compression circuit 67 continuously reads out and outputs the data of one field in every one field period T, F1, F3, F5, or so, which is time-compressed to ½ for four-field period, respectively. As a result, as shown by solid line and broken line in FIG. 12(d), the data F1, F3, F5, and others in every field are sequentially and continuously outputted for the period of four fields, respectively.

Since the one-field data F1, F2, F3, F4 and others corresponding to one-field period in recording are sequentially outputted with composing the data of four fields (two frames), the ¼ speed reproduction data without any noise and composed of every one field in recorded frames is obtained.

In Embodiment 5, if the memory in the compression circuit 67 has a capacity of at least twice as much as for the data obtained in the two-field period 2T (for example, data for F1) in the outputs from the selector 65 in FIG. 12(c), the compression circuit 67 normally compresses the data without overlap of writing and reading of the data for compression in the same memory area.

The field used in ¼ speed reproduction may be composed of even fields F2, F4, F6, F8 selected by the selector 65. Moreover, an odd field and even field may be mixed in one field.

Incidentally, the operation of recording or normal speed reproduction of the first or second information may be same as in Embodiment 1, and the explanation is omitted herein.

When recording the first and second information in Embodiments 1 through 5, the first information and second information inputted to the digital input terminal 50 may be compressed by a highly efficient encoder, not shown in FIG. 2, for reducing the recording data rate. In such case, digital data in normal speed reproduction of the first and second information outputted from the output terminal 60, digital data outputted from the compression circuit 67 in 1/r speed reproduction of the first information, or digital data outputted from the expansion circuit 66 in r times speed reproduction of the second information is better to be decoded by a high efficient decoder not shown in the drawing.

Such, highly efficient coding may be executed by the encoder 51 in FIG. 2. In this case, the coded data may be efficiently decoded by the decoder 61 in FIG. 2 in normal. speed reproduction of the first and second information, 1/r speed reproduction of the first information, or r times speed reproduction of the second information. The outputs from the compression circuit 67 in 1/r speed reproduction of the first information, or the outputs from the expansion circuit 66 in r times speed reproduction of the second information may be decoded by a high efficient decoder not shown herein.

In the foregoing Embodiments 1 through 5, the quantity of the second information is half of the first information, but this is not limited, and generally the embodiments may be applied as the data quantity of 1/r. That is, in recording or normal speed reproduction of the second information, the head rotating speed and tape running speed may be set at 1/r of the speed in recording or normal speed reproduction of the first information. If the head rotating speed and tape running speed in reproduction of the second information are set to be same as in recording or normal speed reproduction of the first information, the r times speed reproduction of the second information mentioned in the Embodiments 1 through 3 may be realized. And if the head rotating speed and tape running speed in reproduction of the first information are set to be same as in recording or normal speed reproduction of the second information, the 1/r or 1/(2·r) speed reproduction of the first information mentioned in the Embodiments 4 and 5 may be realized.

In the discussion of Embodiments 1 through 5, recording and reproducing are done in two channels, but the number of channels is not limited to two; the but the embodiments may be applied as far as the number of channels is one or more. Also in these Embodiments 1 through 5, the required time of one revolution of the drum in recording or normal speed reproduction of the first information is equal to the one-field period T, but it is not required that the both are always equal to each other.

The foregoing embodiments relate to digital VTR for recording digitally, but the concept in these embodiments may be applied also in the analog VTR.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A magnetic recording and reproducing apparatus comprising:

a head disposed on a rotary drum;

means for respectively controlling rotating speed of the rotary drum an running speed of a recording medium;

means for recording and reproducing first information at normal speed respectively on and from the recording medium which runs at a specific speed by scanning of the head disposed on the rotary drum rotating at a specific speed;

means for recording and reproducing second information of 1/r data rate of the first information at normal speed respectively on and from the recording medium which runs at 1/r speed of the specific running speed by scanning of the head disposed on the rotary drum rotating at 1/r speed of the specific rotating speed, wherein r is an integer greater than 1; and means for reproducing the second information at a speed r times as fast as the recording speed of the second information from the recording medium which runs at the specific speed by scanning of the head disposed on the rotary drum rotating at the specific rotating speed, said means for reproducing the second information at a speed r times outputs r-times speed reproduction data by time-expanding the data of one field r times out of r fields which are reproduced within a period corresponding to the recording period of one field.

2. A magnetic recording and reproducing apparatus comprising:

a head disposed on a rotary drum;

means for respectively controlling rotating speed of the rotary drum and running speed of a recording medium;

means for recording and reproducing first information at normal speed respectively on and from the recording medium which runs at a specific speed by scanning of the head disposed on the rotary drum rotating at a specific speed;

means for recording and reproducing second information of 1/r data rate of the first information at normal speed respectively on and from the recording medium which runs at 1/r speed of the specific running speed by scanning of the head disposed on the rotary drum rotating at 1/r speed of the specific rotating speed, wherein r is an integer greater than 1; and means for reproducing the second information at a speed r times as fast as the recording speed of the second information from the recording medium which runs at the specific speed by scanning of the head disposed on the rotary drum rotating at the specific rotating speed, said means for reproducing the second information at a speed r times outputs r-times speed reproduction data by time-expanding the data of one frame composed of two fields r times out of (2·r) fields which are reproduced within a period corresponding to the recording period of two fields.

3. A magnetic recording and reproducing apparatus comprising:

a head disposed on a rotary drum;

means for respectively controlling rotating speed of the rotary drum and running speed of a recording medium;

means for recording and reproducing first information at normal speed respectively on and from the recording medium which runs at a specific speed by scanning of the head disposed on the rotary drum rotating at a specific speed;

means for recording and reproducing second information of 1/r data rate of the first information at normal speed respectively on and from the recording medium which runs at 1/r speed of the specific running speed by scanning of the head disposed on the rotary drum rotating at 1/r speed of the specific rotating speed, wherein r is an integer greater than 1; and means for reproducing the second information at a speed r times as fast as the recording speed of the second information from the recording medium which runs at the specific speed by scanning of the head disposed on the rotary drum rotating at the specific rotating speed, said means for reproducing the second information at a speed r-times outputs r-times speed reproduction data by time-expanding the data of one field r times obtained by synthesizing partial data in each one of two fields at least out of r fields which are reproduced in a period corresponding to the recording period of one field.

4. The magnetic recording and reproducing apparatus of claim 3, wherein the one field data of the r-times speed reproduction is obtained by synthesizing line data on every specific scanning line in each one of two fields at least.

* * * * *